United States Patent
Dietrich et al.

[19]

[11] Patent Number: 5,970,465
[45] Date of Patent: Oct. 19, 1999

[54] METHOD FOR PART PROCUREMENT IN A PRODUCTION SYSTEM WITH CONSTRAINED RESOURCES

[75] Inventors: Brenda Lynn Dietrich, Yorktown Heights; Grace Yuh-Jiun Lin, Goldens Bridge; Ramesh Srinivasan, Yorktown Heights, all of N.Y.

[73] Assignee: International Business Machines Corporation, Armonk, N.Y.

[21] Appl. No.: 08/871,567

[22] Filed: Jun. 4, 1997

Related U.S. Application Data

[63] Continuation of application No. 08/318,590, Oct. 5, 1994, abandoned.

[51] Int. Cl.⁶ .................................................. G06F 17/60
[52] U.S. Cl. ........................ 705/7; 705/10; 364/468.09
[58] Field of Search .............................. 705/7, 8, 10, 28, 705/29; 364/468.05, 468.09, 468.13, 468.16

[56] References Cited

U.S. PATENT DOCUMENTS 5,216,593  6/1993  Dietrich et al. .................... 364/402
5,287,267  2/1994  Jayaraman et al. .................. 364/403

*Primary Examiner*—Frantzy Poinvil
*Attorney, Agent, or Firm*—Scully, Scott, Murphy & Presser; Stephen C. Kaufman, Esq.

[57] ABSTRACT

A method for determining procurement for parts (P) in a production system having constraints comprising at least one of constrained resources ($r_i$) and known maximum demands ($d_j$). The method comprises two steps. Step 1 includes constructing a production planning decision space comprising independent sets of hyperplanes defined by decision variables ($q_j$) corresponding to product quantities for products (j). The constructing step subsumes steps of expressing a potential usage of part (p) as a linear combination of production quantities ($q_j$) based on bill of material usage rules; limiting the production quantities ($q_j$) so that each is less than or equal to the maximum demand quantity ($d_j$); and limiting the production quantities ($q_j$) so that the usage of each resource (r) is based on bill of material and bill of capacity usage rates less than or equal to the availability of that resource. For each part p, the second step includes locating a region in the decision space corresponding to a high level of usage of part (p).

9 Claims, 10 Drawing Sheets

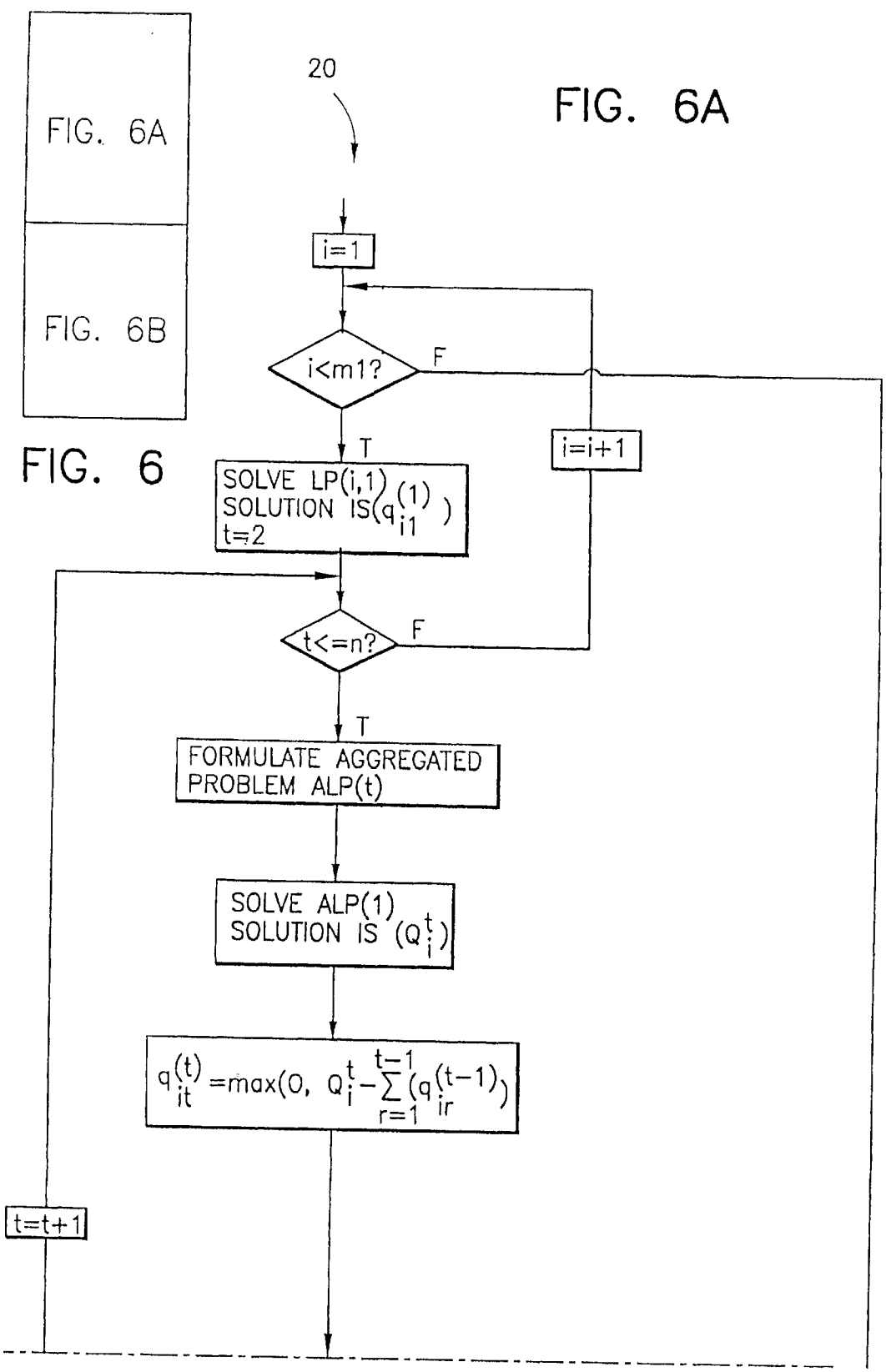

METHOD FOR PART PROCUREMENT IN A PRODUCTION SYSTEM WITH CONSTRAINED RESOURCES

This application is a continuation of application Ser. No. 08/318,590, filed Oct. 5, 1994, now abandoned.

FIELD OF THE INVENTION

This invention relates to a method for determining a part procurement level in a production system having constraints. For example, the constraints may comprise at least one of constrained resources and known maximum demands.

BACKGROUND OF THE INVENTION

In today's competitive marketplace, customer satisfaction is one key for business success. To this end, many manufacturing companies are undergoing re-engineering processes as they search for ways to provide high quality, low cost, and just-in-time service. Achieving such manufacturing excellence requires many interrelated activities, such as supply-chain management, logistics modeling, production planning, scheduling, control, and breakthroughs or improvements in technology.

Part procurement and inventory control also play an important role in the manufacturing process. For example, a shortage of parts can disrupt production schedules, lower serviceability, cause product shortages, or lead to customer dissatisfaction. Excessive inventory, on the other hand, can not only increase manufacturing, storage and transportation costs, but also hurt a market value of a product. Accordingly, a strategy is needed which can maintain an optimal balance between part procurement and inventory control, thus allowing a company to maximize its serviceability (or responsiveness to demand variation) with minimum inventory.

SUMMARY OF THE INVENTION

Assuming that future demands for final products are known with certainty and that part supplies and resources are unconstrained, "squared sets" of part components can be procured so that they are completely consumed by a production plan that meets demands with minimal work-in-process (WIP) and inventory cost. Such squared sets can be determined by material requirement planning (MRP) software such as MAPICS.

This approach is normally referred to as an "explosion" approach. (See Vollmann, T. E., Berry, W. L. and Whybark, D.C., "Manufacturing Planning and Control Systems", Richard D. Irwin, Inc., 1992.)

On the other hand, if future demands are known, but there are constraints on part supplies and resource capacity, an MRP solution may not be feasible since it may violate resource or supply constraints. As a result, plants may not be able to meet all the demands in the specified time period. In this situation, "squared sets" of part components can be procured to meet partial demand. The partial demand can be selected to optimize an economic objective function such as profit by using e.g., linear mathematical programming (LP) or heuristic allocation algorithms.

Unfortunately, in most cases, demand is uncertain at the planning stage. Thus, the solutions found by either explosion or linear programming may not be feasible since either demand or supply constrains may have fluctuated, and voided the assumption used to generate a solution. We therefore note that an extant problem is to find a procurement level that can best accommodate the demand changes with minimal WIP and inventory when demand is uncertain and supplies are constrained.

Researchers have addressed this issue by assuming simple product structure with different objective and stochastic demand assumptions. For examples, see Baker, K. R., Magazine M. J., and Nuttle, H. L., "The Effect of Comonality on Safety Stock in a Simple Inventory Model," Management Science, Vol. 32, No. 8, pp. 982–988, 1986 and Gerchak, Y., Magazine, M. J. and Gamble A. B., "Component Commonality with Service Level Requirements", Management Science, Vol. 34, No. 6, pp. 753–760, 1988 and Lagodimos, A. G., "Multi-Echelon service Models for Inventory Systems Under Different Rationing Policies", International Journal of Production Research, Vol. 30, No. 4, pp. 939–958, 1992 and Srinivasan R., Jayaraman R., Dietrich B. L., and Hague, A., "Component Procurement under Demand Uncertainty for Main-frame Subassemblies", accepted for publication in Journal of Electronics Manufacturing, Chapman and Hall, London, UK, July 1993 and Jayaraman R., Roundy R., and Srinivasan R., "Methods for Parts Procurement Quantity Determination Where Demand is Uncertain for the Product in Which the Parts Are Used," U.S. Pat. No. 5,287,267, issued Feb. 15, 1994.

This invention, in sharp contrast to the cited references, solves this problem by providing a methodology to determine a procurement level for all part components. The goal is to achieve the highest service level while maintaining the lowest possible WIP and inventory on the basis of linear demand, resource, and supply constraining information. We call the solution corresponding to this problem the "Stochastic Squaring Solution" (SS solution).

To this end, we now disclose a method for determining procurement level for parts (P) in a production system having constraints comprising at least one of constrained resources ($r_i$) and known maximum demands ($d_j$). The method comprises the two steps of:

1) constructing a production planning decision space comprising independent sets of hyperplanes defined by decision variables ($q_j$) corresponding to product quantities for products (j), said constructing step comprising:

a) expressing a potential usage of part (p) as a linear combination of production quantities ($q_j$) based on bill of material usage rules;

b) limiting the production quantities ($q_j$) so that each is less than or equal to the maximum demand quantity ($d_j$); and c) limiting the production quantities ($q_j$) so that the usage of each other resource ($r_i$) based on bill of material and bill of capacity usage rates is less than or equal to the availability of that resource; and 2) for each part (p), locating a region in the decision space corresponding to a high level of usage of part (p).

In a second aspect, the present invention comprises a machine suitable for determining procurement level for parts (P) in a production arrangement having constraints comprising at least one of constrained resources ($r_i$) and known maximum demands ($d_j$), the machine comprising:

1) means for creating a production planning decision space comprising independent sets of hyperplanes defined by decision variables ($q_j$) corresponding to product quantities for product (j), said means comprising:

a) expressing a potential usage of part (p) as a linear combination of production quantities ($q_j$);

b) limiting the production quantities ($q_j$) so that each is less than or equal to the maximum demand quantity ($d_j$);

and c) limiting the production quantities ($q_j$) so that the usage of each other resource ($r_i$) based on bill of material and bill of capacity usage rates is less than or equal to the availability of that resource;

and 2) means associated with each part (p) for locating a region in the decision space corresponding to a high level of usage of part (p).

The novel invention as defined can realize several significant advantages, especially in relation to dynamics of applicability and inherent capabilities.

First of all, the novel invention comprises a means for component procurement to minimize a procurement cost while preserving a maximum possible service level under demand and supply constraints.

The novel invention includes capabilities for finding a maximum possible usage of a component j in period t given a maximum demand or linear demand constraint for product, bill of capacity and bill of materials, and resource availability.

The novel invention includes capabilities and methodologies for finding a maximum possible usage of a single component j over multiple time periods t given a maximum demand or linear demand constraint for product, bill of capacity and bill of materials, and resource availability.

The novel invention also includes capabilities and methodologies for finding a maximum possible usage of many components over one or multiple time periods given maximum demand or linear demand constraint for product, bill of capacity and bill of materials, and resource availability. Further, the novel invention includes methodologies for finding a maximum possible usage of the components for simple bill of material (BOM) structure, or for finding a maximum possible usage of the components for complex BOM structure.

Other advantages include providing methodologies for finding a maximum possible usage of the components accommodating subassembly supply, or for developing a full scale procurement planning tool.

BRIEF DESCRIPTION OF THE DRAWINGS

The invention is illustrated by the accompanying drawings, in which.

and

Figure 12:
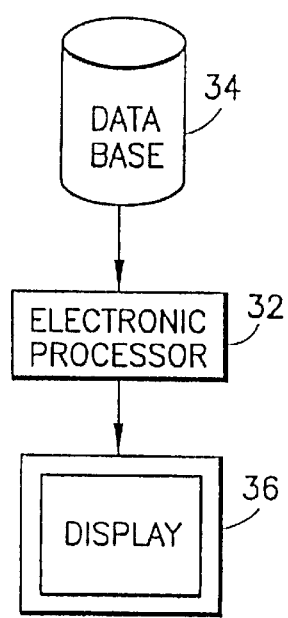

FIG. 12 illustrates machine implementation of the present invention.

DETAILED DESCRIPTION OF THE INVENTION

1. Overview

In this invention, a preferred mathematical model for representing a Stochastic Solution problem is first defined; then, preferred methodologies and algorithms for finding the Stochastic Squaring (SS) solutions are described; finally, preferred procedures for implementing the solutions are presented.

In overview, given a Bill of Material (BOM), maximum possible demands or linear demand constraints, in-house stocks, committed supplies, and additional external supplies, we present preferred methods to find the Stochastic Squaring solution. The SS solution can determine a component procurement level from the additional external supplies to accommodate, as much as possible, a fluctuating demand while minimizing inventory overhead. Thus, the solution does not recommend either early procurement of parts or procurement of excessive components. "Excessive" components are parts that cannot be used by any feasible production plan. To achieve customer satisfaction, one should always try to meet the demand and minimize back orders. If future supplies are constrained, and excess supply is available now, it may be necessary to procure some components ahead of their required usage date.

2. Preferred Embodiments

Figure 1:
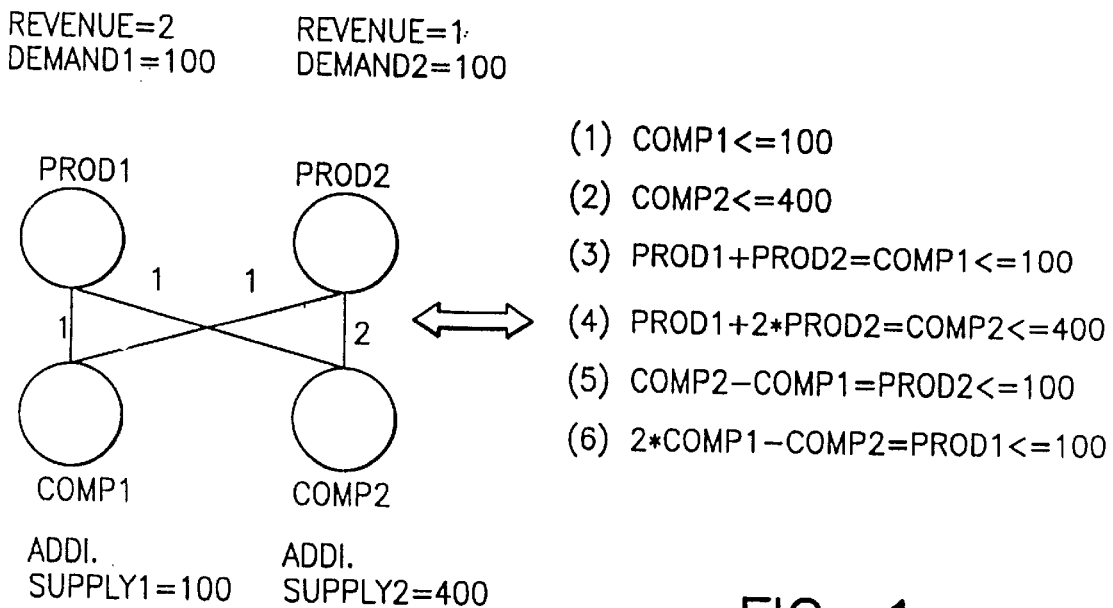
FIG. 1 demonstrates a concept of the invention and shows single level bill of materials (BOM) and constraints.

To demonstrate the concept of the SS solution and show the differences between the conventional MRP solution method, an LP solution method and an SS solution method, first consider a single-level, single-period problem as shown in FIG. 1, numeral 10. The BOM, additional external supply, demand, and revenue information are as described in FIG. 1. Assume there is no in-house stock and committed supply. Since the supplies are 100 and 400 for components 1 and 2, we get equations (1) and (2) as shown in FIG. 1. Also, since each unit of product 1 consumes one unit of component 1 and one unit of component 2, and each unit of product 2 consumes one unit of component 1 and two units of component 2, we get the material balance equations (3) and (4). After algebraic manipulation of equations (3) and (4) and considering the demand constraints for product 1 and 2, we get equations (5) and (6). The feasible region of the linear equalities (1), (2), (3), and (4) is shown as the shaded area in FIG. 2, numeral 12.

Now, let's consider the MRP, LP, and SS solutions for this simple problem. The MRP solution gives the amount of each component needed to meet the demand, which is 200 units of component 1 and 300 units of component 2. Since we have only 100 of component 1, we order 100 of component 1 and 300 of component 2. Therefore (100,300) is the MRP solution.

Now consider a conventional LP based method assuming the objective is to maximize the revenue. Since the revenue of producing product 1 is 2, which is higher than the revenue of producing product 2, and since there is a demand of 100 for product 1 and a supply of 100 of component 1, the LP allocates 100 of component 1 to make 100 of product 1 to achieve the optimal revenue. Therefore, the LP solution is (100,100).

Figure 2:
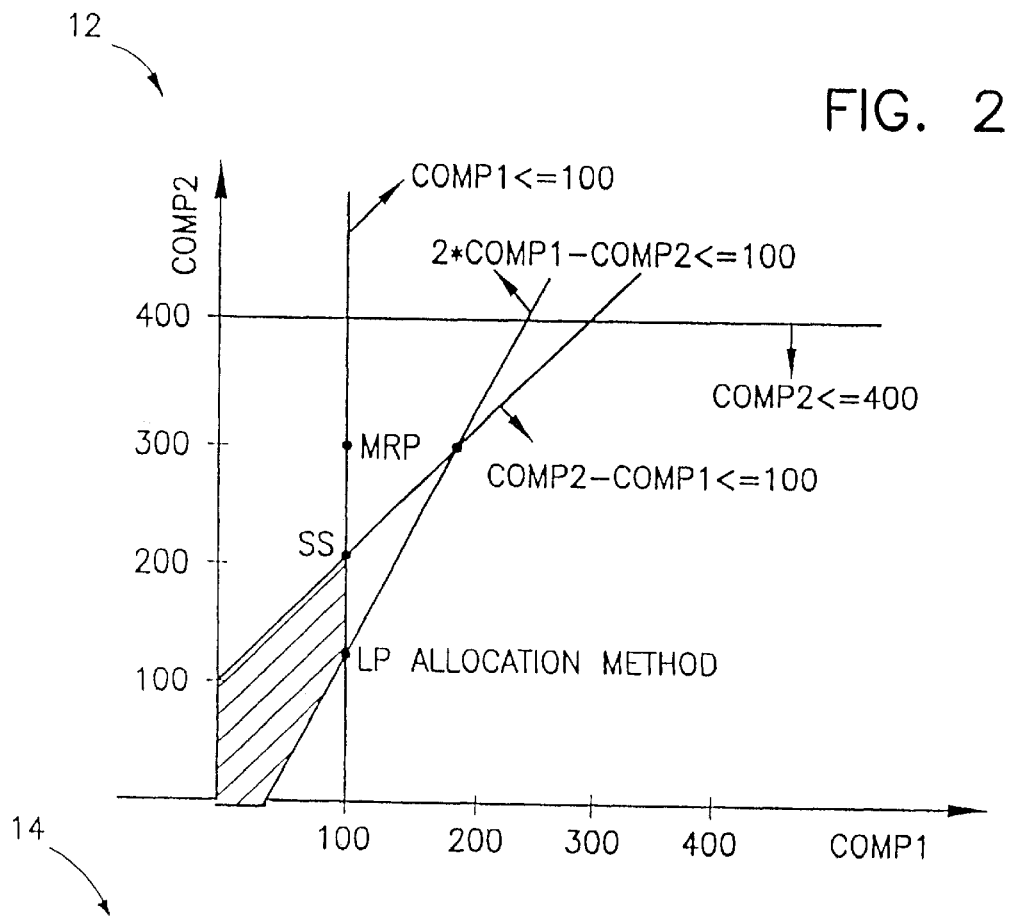
FIG. 2 shows a comparison of Material Requirement Planning (MRP), Linear Programming (LP) and Stochastic Squaring Solutions.

The SS solution for this example is (100,200), since the maximum possible usage of component 1 is 100, which occurs when 100 units of product 1 are produced. And the maximum possible usage of component 2 is 200, which occurs when all of component 1 is allocated to produce 100 of product 2. FIG. 2 shows the comparison of the MRP, LP, and SS solutions.

Figure 3:
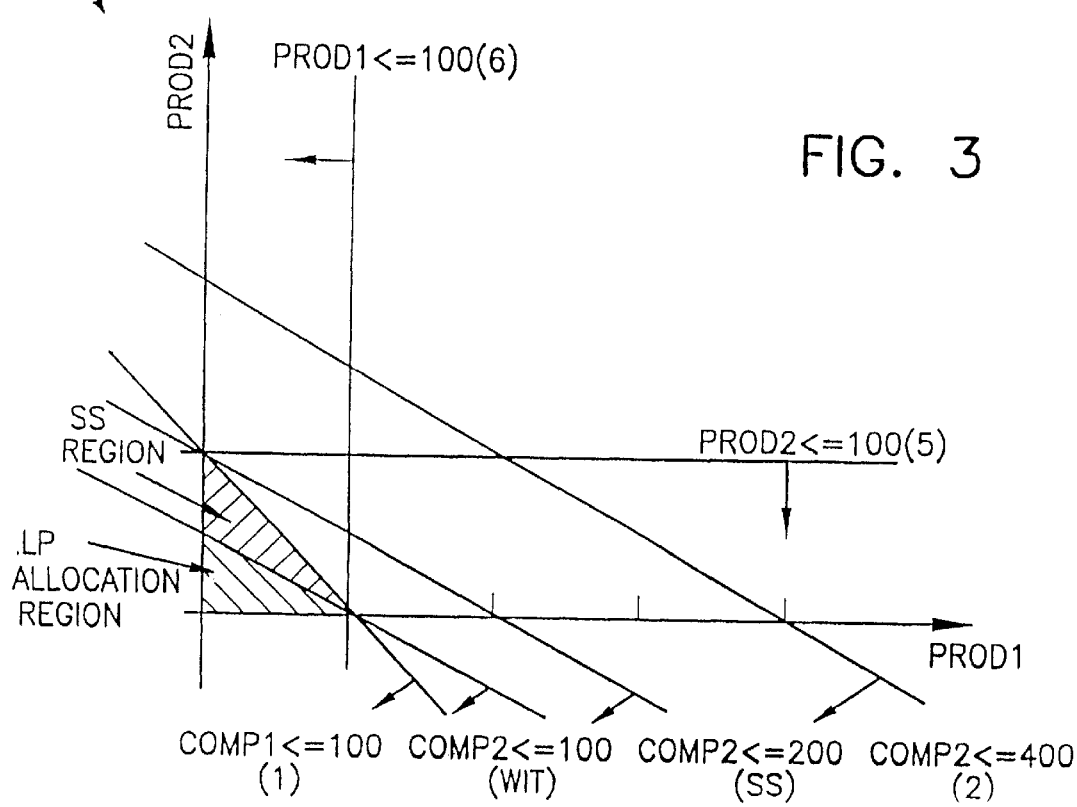
FIG. 3 provides a comparison of serviceability for Linear Programming (LP) and SS solutions.

Adopting the MRP solution creates at least 100 units of excess inventory for component 2. The LP solution of procuring 100 of component 1 and 2 to make 100 of product 1 optimizes the revenue if the realized demand is (100,100). However, if the realized demand turns out to be (50,50), we can only meet (50,25) since we only have 100 units of component 2. However, the SS solution of (100,200) best accommodates the potential demand changes. FIG. 3 (numeral 14) shows the constraints imposed by the availability of the two components on the production of the two products. In this FIG. 3, the SS solution covers the demand within the shaded area, while the LP solution covers only the black area.

3. Stochastic Squaring Problems and Solutions

Figure 4:
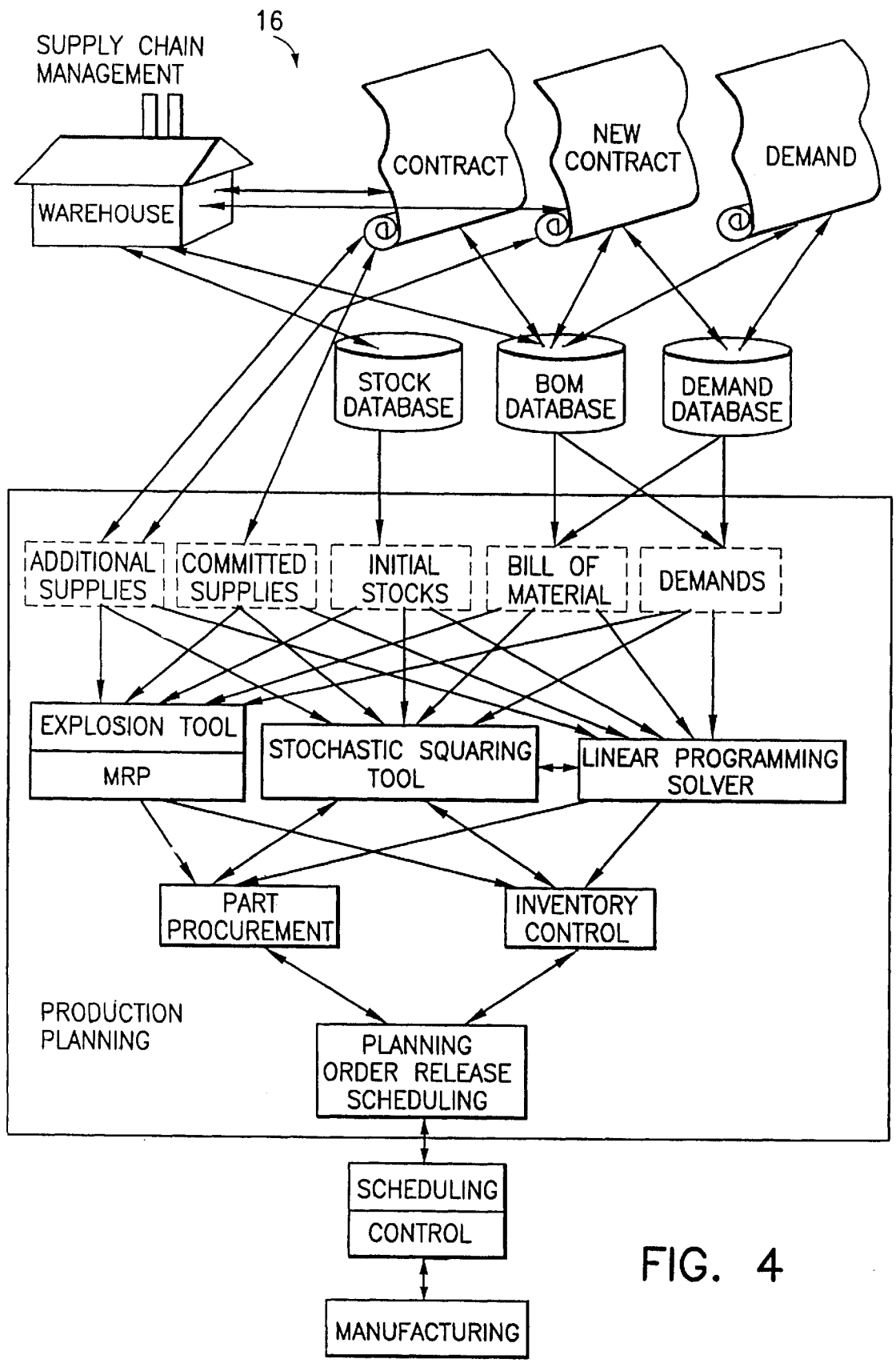
FIG. 4 shows the Stochastic Squaring System in a manufacturing environment.

In this section, we present preferred definitions, model formulations, and solution algorithms for several illustrative Stochastic Squaring problems. We begin with a simplest single-level and single-period problem, and then demonstrate how the approach can be modified to cover much more complex problems by gradually relaxing the assumptions. General reference may be made to FIG. 4 (numeral 16).

Definitions

Part. A part is a basic object of the problem. Parts may enter the system as external supply, committed supply, or in-house stock. The manufacturing system assembles parts into other parts with perhaps several stages of production. The parts are then used to meet external demands, while the excess parts become the inventory. Each part is either a raw material or a product.

Raw Material. A raw material is a part which cannot be built within the manufacturing system. Any raw material that is not used in one period remains available for use in the next period. Raw material comes into the system only as external supply.

Product. A product is a part that can be built within the manufacturing system. Any quantity of a product that is not used in one period is available for use in the next period. Each product has a bill-of-materials specifying how it is built from other parts. The time it takes to build the product in-house is called the lead-time of the product. A product may also come into the system from external supply.

Capacity. Capacity is normally associated with manufacturing resources such as machines or labor. Quantities of capacity not used in one period are not available for use in the next period. A capacity represents some limitation on the number of parts that can be produced during a period.

Resource. We use the term resource to refer to both material and capacity.

Bill-of-Capacity (BOC). The BOC of a product specifies how a product is built from the capacity resources it requires.

Figure 5:
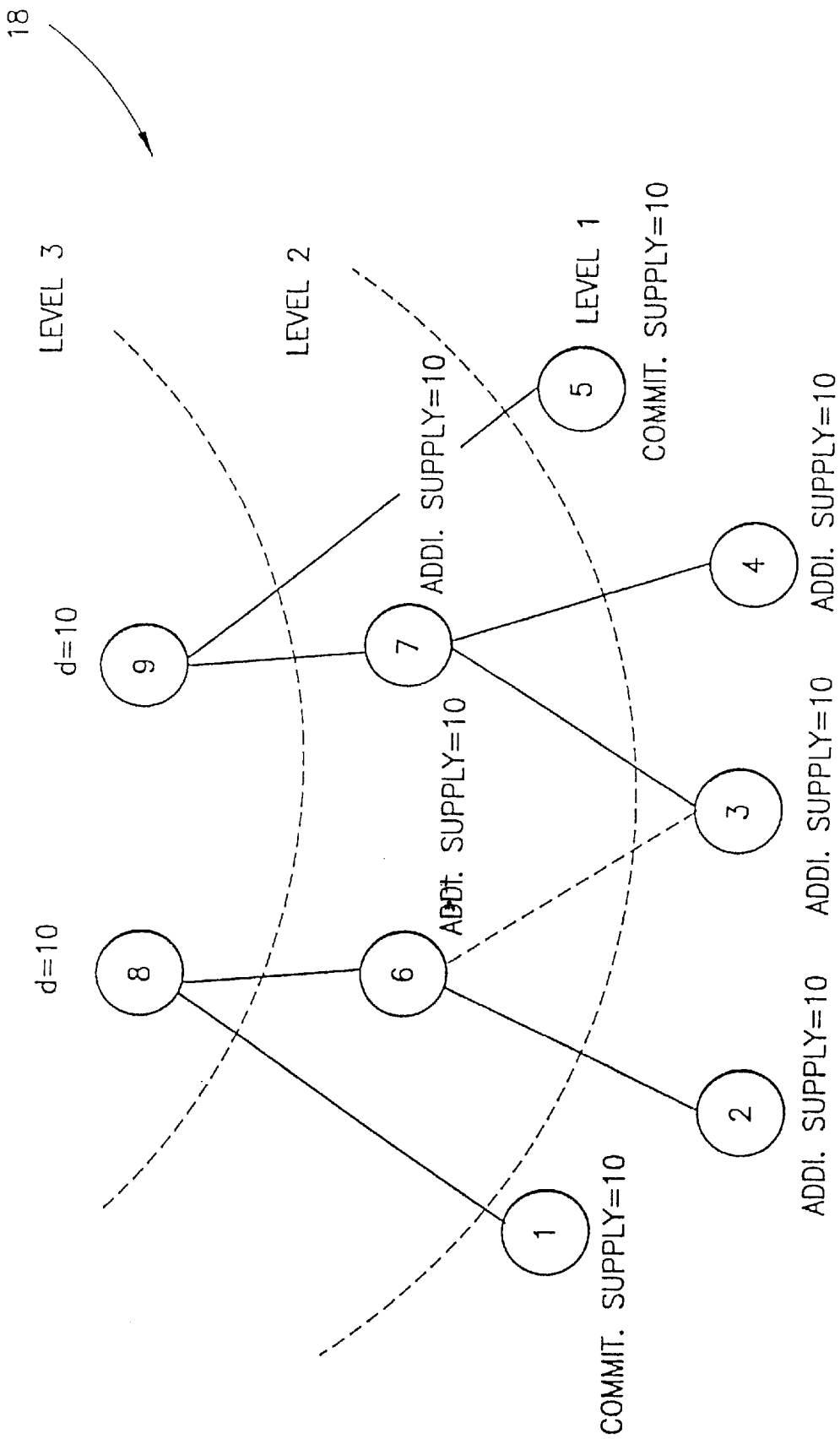
FIG. 5 shows a multiple-level bill of material.

Bill-of-Material (BOM). The BOM of a product specifies how a product is built from the parts it requires. The BOM of the system specifies the complete interrelationship among all parts. Any part that appears in the BOM of a product is a component of the product. A BOM that includes only raw materials as components is called a single level BOM. A BOM that includes products as components is a multi-level BOM. FIG. 1 shows an example of a single level BOM, and FIG. 5 (numeral 18) shows an example of a multi-level BOM.

Bill-of-Resource (BOR). The BOR of a product specifies how the product is built form the capacity resource and parts it requires. The BOR is the union of the BOM and the BOC.

BOM Component Level. Raw materials are called level one components. A product whose bill of materials specifies only level one components is called a level two component. Continuing this process, a product whose bill of materials specifies only level one to level n−1 components is called a level n components.

Service Level. Given demand and supply constraints, a demand level said to be feasible if it can be filled from the available supply. The probability that the realized (actual) demand level is feasible is called the service level achieved by the supply.

Stochastic Squaring Solution. A SS solution gives a procurement plan that preserves the service level given by the original supply and minimizes excess inventory.

The SS solution specifies the quantity of each part to procure in each time period given the initial demand and supply information. If the per-unit procurement cost of each part is fixed (not volume dependent) the SS solution maximizes the service level with minimum cost. To find the SS solution, we need to find the minimum procurement level that preserves the feasiblility of all demand levels that can be filled with the original supply. We present the single-level, single-period SS problem in section 3.1. The single-level, multi-period, SS problem with zero lead-time is discussed in section 3.2. The single-level, multi-period with non-zero lead-time problem is discussed in section 3.3. And finally, the general multi-level, multi-period problem is presented in section 3.4.

3.1 Single-Level, Single-Period, Stochastic Squaring

In this section, we discuss the stochastic squaring problem with simplifying assumptions. Only single-level BOMs such as the example shown in FIG. 1 are considered. We assume that supplies exist only at raw material level, and demands exist only at the end product level. Only one planning period is considered, and all production is assumed to begin and end within this period. More specifically, there is a committed supply for each raw material; in addition, a raw material may also have an additional external supply associated with it. We also initially assume that there are no capacity resource constraints. These assumptions are relaxed in a later section.

3.1.1 Definitions

The following notation is used:

$I=\{1,2,\ldots,m_1\}$: a set of raw material numbers, $J=\{1,2,\ldots,m_2\}$: a set of product numbers, $v=(v_i)_{i=1}^{m_1}$ where $v_i$ is the quantity of committed supply of raw material i, $e=(e_i)_{i=1}^{m_1}$ where $e_i$ is the quantity of additional external supply of raw material i, $a=(a_{i,j})_{i=1}^{m_1},{}_{j=1}^{m_2}$ where $a_{i,j}$ is the quantity of raw material i required per unit of product j, Note that a denotes the BOM usage rates.

$d^{max}=(d_j^{max})_{j=1}^{m_2}$, where $d_j^{max}$ is the maximum demand quantity for product.

Then, procurement quantities $q=(q_i)_{i=1}^{m_1}$ are Stochastically Squared with respect to $(J, v, e, a, d^{max})$, if for each $i_0$, the quantity $qi_0$ is the maximum of 0 and the largest number that is less than or equal to $e_{i_0}$ such that there exists a demand scenario $$(d_1^{i_0}, d_2^{i_0}, \ldots, d_{m_2}^{i_0}) \leq (d_1^{max}, d_2^{max}, \ldots, d_{m_2}^{max})$$

that is feasible with respect to the supply quantities $(v_i+q_{ii=1}^{m_1}$ and will consume $q_i+v_i$ units of raw material i. Note that different components i and k may be consumed by different feasible demand scenarios. The vector inequality is to be interpreted component-wise.

3.1.2 Linear Programming Formulation and Stochastic Squaring Solution

Preferably, a first step in solving the problem is to formulate the problem as a linear program (LP). Our main objective is to find the maximum possible usage of each component under the demand and material availability constraints. We require that the usage exhaust the committed supply before acquiring additional external supply. Solving for the stochastically squared solution can be done by analyzing each part independently. There is an LP associated with each part i that has an additional supply $e_i>0$. The objective of the LP is to maximize the usage of the additional supply while penalizing any unused committed supply of part i. The penalty is a big number denoted by M in the following linear programming formulation. The constraints specified include the material balance constraints and the bounds for supply and demand. The corresponding preferred linear programming formulation is as follows:

The decision variables for the LP are $d=(d_j)_{j=1}^{m_2}$ where $d_j$ is the quantity of filled demand for product j, $s=(s_i)_{i=1}^{m_1}$ where $s_i$ is the quantity of raw material i used from the committed supply $v_i$, and $q=(q_i)_{i=1}^{m_1}$ where $q_i$ is the quantity of raw material i used from additional external supply $e_i$. For each $i_0$, $1 \leq i_0 \leq m_1$, let $\hat{p}_{i_0}$ be the solution to the following linear programming:

(2) max $q_{i_0} - M(v_{i_0} - s_{i_0})$  I.

subject to (a) $q_i + s_i - \sum_{k=1}^{m_2} a_{i,k} d_k = 0,$ for $1, \leq i \leq m_1$   II (c) $0 \leq q_i \leq e_i,$ for $1 \leq i \leq m_1$ (1) $0 \leq s_i \leq v_i,$ for $1 \leq i \leq m_1$ (b) $0 \leq d_j \leq d_j^{max},$ for $1 \leq j \leq m_2$.

For the sake of pedagogy, we hereby note explicitly a correspondence between the invention as summarized broadly above, and a preferred realization of it by way of expressions 1, 11. In particular, the (left hand column) alpha-numerics (1), (2), (a), (b), (c) tagged to relevant subsumed components of equations I,II, map onto corresponding clauses of the summarized invention above. For example, the step (1) "constructing a production planning decision space comprising independent sets of hyperplanes", may be realized by way of the four inequalities subsumed by expression II, while the step (2)" locating a region in the decision space corresponding to a high level of usage of part (p)", may be realized by way of expression I.

Continuing, note that the introduction of variables s in the material balance constraints, instead of using the committed supply quantity v, avoids infeasibilities when the committed supply is more than can be used. The first constraint is the material balance constraints which says that the number of the components used from the committed supply $s_i$ plus the number used from the additional external supply $q_i$ is equal to the amount used to produce products to meet demands. The rest of the constraints are bound constraints that limit the range of values that each of the decision variables can take.

To obtain the SS solution, one solves an LP as presented above for each raw material i that has additional external supply $e_i>0$. At most $m_1$ (number of raw material) LPs must be solved to compute the Stochastic Squaring (SS) solution. These LPS all have the same decisions variables and constraints; they differ only in the choice of objective function.

The solution methodology presented above can be easily extended to consider the capacity constraints and linear constraints among demands. The following additional notation is used:

$R=\{1,2,\ldots,w_0\}$: a set of capacity resource numbers,
$c=(c_w)_{w=1}^{w_0}$, where $c_w$ is the quantity of capacity w available.
$g=(g_{wj})_{w=1}^{w_0}{}_{j=1}^{m_2}$, where $g_{w,j}$ is the quantity of capacity resource w to produce a unit of product j, for each resource w and product j. Note that g denotes the BOC usage rates. The sum of the capacity used to produce each product should be less than or equal to the total capacity available. The mathematical representation is as follows:

$$\sum_{j=1}^{m_2} g_{w,j} d_j \leq c_w,$$

for $1 \leq w \leq w_0$

Capacity limits can be considered in determining the SS solution by adding the above constraint to the LP described above.

The LP formulation can also be modified to take into account linear relationships between the demand for different products. The maximum demand constraint can be replaced by the following general linear demand constraints.

$$\sum_{j \in S} u_j d_j \leq Q_s,$$

for $S \subseteq J$, and constants $Q_s$, $u_j$, $j \in S$.

3.2 Single-Level, Multi-Period, Stochastic Squaring with Zero Lead-Time

In this section, we consider the single-level stochastic squaring problem with a multi-period planning horizon. That is, the procurement problem is considered for n periods of time. The committed supplies, demands, additional external supplies for part components and other BOM input parameters are specified for each time period. Unused committed supply remains available for use in the next period; unfilled demand from one period can be filled in a later period. We assume that the lead-time of production, which is how long it takes for a product to be built from its raw materials, is significantly less than the length of a planning period. This assumption implies that the completed product is available in the same period as the raw material is consumed. In a later section this condition is relaxed. An SS solution specifies a procurement level for each component in each time period. The SS solution optimizes serviceability while minimizing inventory. The multi-period SS solution concept is captured in the following definition.

3.2.1 Definition

We use the following notation:
$I=\{1,2,\ldots,m_1\}$: a set of raw material numbers,
$J=\{1,2,\ldots,m_2\}$: a set of product numbers,
$T=\{1,2,\ldots,n\}$: a set of time periods,
$v=(v_{i,t})_{i=1}^{m_1}{}_{t=1}^{n}$, where $v_{i,t}$ is the quantity of the committed supply of raw material i that will arrive at the beginning of time period t,
$e=(e_{i,t})_{i=1}^{m_1}{}_{t=1}^{n}$, where $e_{i,t}$ is the quantity of additional external supply of raw material i available at the beginning of period t,
$d^{max}=(d_{j,t}^{max})_{j=1}^{m_2}{}_{t=1}^{n}$ where is the maximum demand of product j at time t.

As in the single-period case, a denotes the BOM usage rates.

Then, $q=(q_{i,t})_{i=1}^{m_1}{}_{t=1}^{n}$ is Stochastic Squared with respect to (J, v, e, a, $d^{max}$), if for each $i_0$ and t, the value $q_{i_0,t}$ is the maximum of 0 and the largest number that is less than or equal to $e_{i_0,t}$ such that there exists a demand scenario $d=(d_{i,r}^{i_0})_{i=1}^{m_1}{}_{r=1}^{n}$ satisfying $$\sum_{k=1}^{r}(d_{i,k}^{i_0}) \le \sum_{k=1}^{r}(d_{i,k}^{\max}),$$

for $1 \le i \le m$, $1 \le r \le n$
that is feasible with respect to the supply quantities $(v_{i,t}+q_{i,t})_{i=1}^{m_1}{}_{,t=1}^{n}$ and can consume the procurement schedule $(q_{i_0,t})_{t=1}^{n}$ for $i_0$ according to the following rules:

1. At each time period r, the cumulative committed supply $$\sum_{k=1}^{r} v_{i_0,k}$$

of $i_0$ should be used first to fulfill the demand. External supply in r is used only if the cumulative committed supply up to period r is exhausted.

2. If the external supply of period r is exhausted, the unused external supplies of the previous periods are used, starting with the latest period and continuing backward in time all the demand is met or the supply is exhausted. Any remaining unfilled demand is then filled in a later period, r+1, r+2, . . . , n, as early as possible.

3.2.2 Single Level, Multiple-Period Stochastic Squaring with Zero-Lead Time

Following the SS solution defined in the above subsection, the problem involving single-level, multiple-period stochastic squaring with zero lead-time problem preferably is solved by a procedure that utilizes the linear programming formulation introduced in section 3.1. The main idea is to compress the multi-period problem into a series of aggregate single-period problems, solve the aggregate single-period problem using the procedure described in the above section, and use the solutions to the aggregate problems to compute a solution to the multi-period problem. As in the single-period case, the raw materials with additional external supply can be analyzed independently. For each raw material, a single-period SS problem corresponding to the planning period t=1 is solved by the method introduced in section 3.1. This gives initial planned procurement levels for period t=1. Then, for each integer r=2,3, . . . ,n, a single-period planning period corresponding to the aggregation of periods t=1, 2, . . . ,r is formulated by summing up all the corresponding demands and supplies for the r periods. Solving the aggregated problem by the method outlined in section 3.1 produces the aggregated solution for the first r time periods, which gives us the maximum possible component usage for the entire interval considered. By comparing the maximum possible component usage in periods 1 though r with the maximum possible component usage in periods 1 through r−1, we can determine a target procurement level for period r. If the target procurement level is available in period r then it should be procured in period r; otherwise some portion of it must be procured in some earlier period. To minimize inventory, the excess quantity should be procured as late as possible, so we compare planned procurement levels to availability levels in the previous periods t=r−1, r−2, . . . ,1. until sufficient excess supply is found. The planned procurement levels are adjusted to account for this additional procurement. In summary, we solve a series of aggregate problems, to determine the maximum total usage of each raw material in periods 1 through r, for r=1, . . . ,t. Each aggregate problem can be solved as a single period problem using the method described in section 3.1. Then, we use a netting procedure to propagate any excess procurement volume to an earlier period to find a feasible solution with minimal inventory. An iterative step is next used to compute the multi-period solution. More specifically, this problem preferably is solved by the following combination of LP, netting, and iterative procedure. For each raw material i and each period t let the aggregate committed supply $V_{i,t}$ and the aggregate additional supply $E_{i,t}$, respectively, be given by $$V_{i,t} = \sum_{r=1}^{t} v_{i,r} \text{ and } E_{i,t} = \sum_{r=1}^{t} e_{i,r}$$

Similarly, for each product j and each period t let the aggregate maximum demand $D_{j,t}^{max}$ be given by $$D_{j,t}^{\max} = \sum_{r=1}^{t} d_{j,r}^{\max}$$

For each raw material i and period t let $LP_i(t)$ be the linear programming formulation described in the last section for a single period t and let $ALP_i(t)$ be the linear programming problem corresponding to the aggregate supply and demand data, $V_{i,t}$, $E_{i,t}$, and $D_{j,t}^{max}$. Then the following preferred procedure provides the SS solution.

Procedure 1: Multi-Period Stochastic Squaring Procedure.
Initial Step. Ror each raw material i, determine the SS solution for the one-period problem corresponding to t=1 using the LP described in section 3.1.2. Let $(q_{i,1}^{(1)})_{i=1}^{m_1}$ be the resulting SS solution. The super-script denotes the iteration number.

Iterative Step. For i=1 to $m_1$ do
For t=2 to n do

1. Let $(q_{i,r}^{(t-1)})_{1 \le r \le t-1}$ denote the SS solution for the multi-period problem up to time period t−1.

2. Construct new SS solutions for the multi-period problem up to time period t as follows:

(a) Solve $ALP_i(t)$. Let $Q_i^t$ be the aggregate SS solution found.
   (b) Netting Procedure:
   Let $$q_{i,t}^{(t)} = \max\left(0, Q_i - \sum_{r=1}^{t-1} q_{i,r}^{t-1}\right).$$

If $q_{i,t}^{(t)} \le e_{i,t}$, then $q_{i,r}^{(t)} = q_{i,r}^{(t-1)}$ for r=1,2, . . . ,t−1 else construct the solution $(q_{i,r}^{(t)})$ from $q_{i,t}^{(t)}$ and $q_{i,r}^{(t-1)}$ by applying the following "push-back" procedure.

"Push-back" procedure:
i. Let $\delta_{i,t} = q_{i,t}^{(t)} - e_{i,t}$ and $q_{i,t}^{(t)} = e_{i,t}$.
ii. r=t−1, done=false
iii. while $r \ge 1$ and done=false do $$\delta_{i,r}^{(t-1)} = e_{i,r} - q_{i,r}^{(t-1)},$$

if $\delta_{i,r}^{(t-1)} > \delta_{i,r+1}$ then do:

$$q_{i,r}^{(t)} = q_{i,r}^{(t-1)} + \delta_{i,r+1} \text{ and } q_{i,k}^{(t)} = q_{i,k}^{(t-1)}, \text{ for all } k < r$$

done=true
else do:

$$q_{i,r}^{(t)} = e_{i,r}, \delta_{i,r+1} = \delta_{i,r}^{(t-1)}.$$

r=r−1.

Figure 6B:
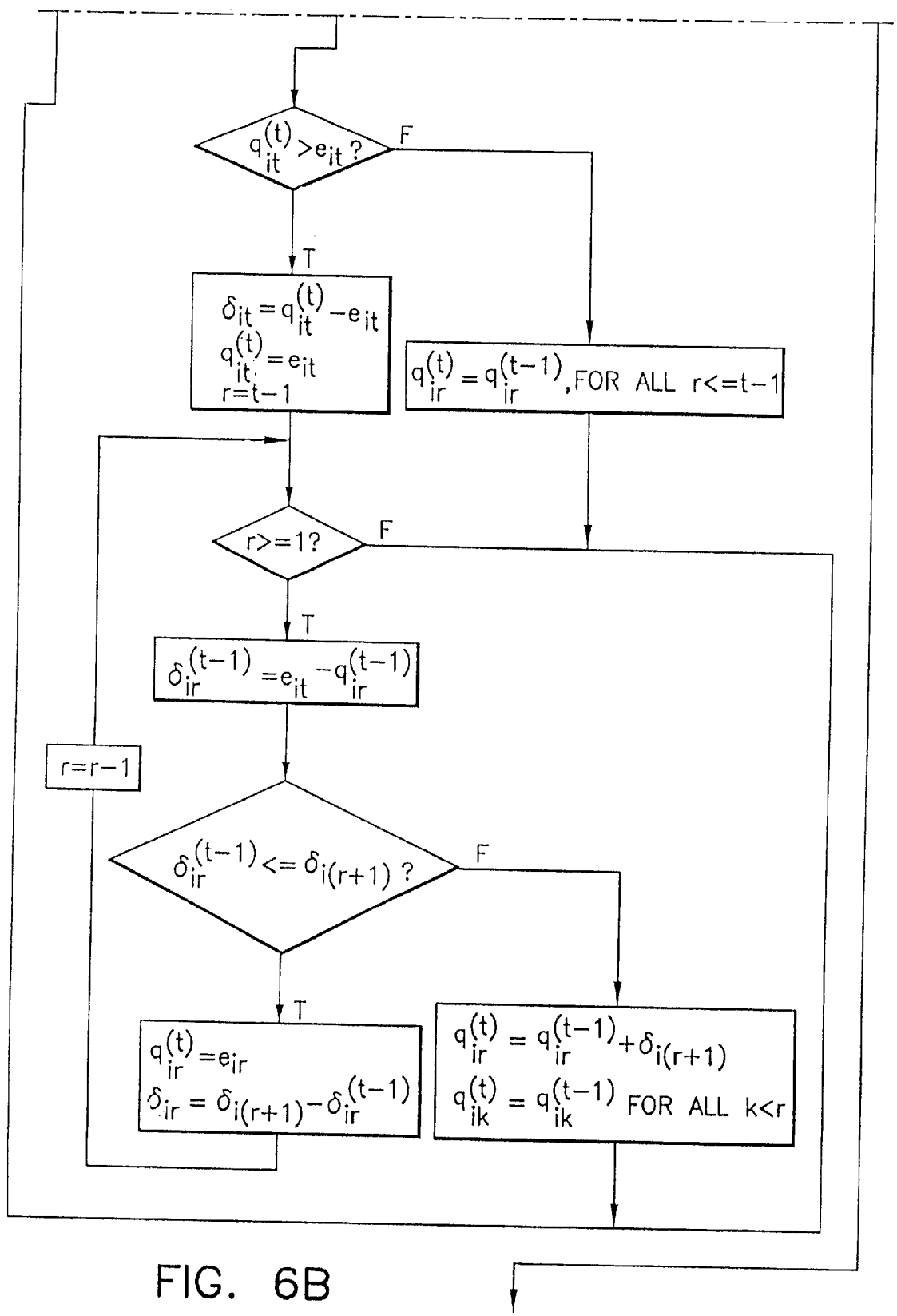
FIG. 6 provides a flow chart of a multi-period stochastic squaring procedure.

Note that the "push-back" procedure moves excess procurement in period t to the latest earlier period that can accommodate the excess. FIG. 6, numeral 20, provides a flow chart of the multi-period stochastic squaring procedure.

3.3 Single Level, Multi-Period, Stochastic Squaring with Non-Zero Lead Time

For problems with non-zero lead-time, the iterative procedure presented above, based on solving aggregate linear programs, cannot be applied since a part with nonzero lead-time cannot be released and finished in the same period. A product that begins production in time period t will become available at time period t +lead-time. Instead of using an iterative procedure based on smaller LPs, we formulate the multi-period problem as a larger LP with time-indexed variables, and factor the lead-time information into the constraints. The engineering change and lead-time offset is captured in the formulation. The capacity constraints are also modeled.

We use the following notation:

Let I, J, T, v, e, and $d^{max}$ be defined as in section 3.2.1.

$a = (a_{i,j,t,r})_{i=1}^{m_1}, {}_{j=1}^{m_2}, {}_{t=1}^{n}, {}_{r=1}^{n}$, $a_{i,j,t,r}$ specifies the quantity of component i required in period t per unit of product j produced in period r, $R = \{1, 2, \ldots, w_0\}$: a set of resources, $g = (g_{w,j,t,r})_{w=1}^{w_0}, {}_{j=1}^{m_2}, {}_{t=1}^{n}, {}_{r=1}^{n}$, where $g_{w,j,t,r}$ specifies the quantity of resource w required in period t per unit of product j produced in period r, $c = (c_{w,t})_{w=1}^{w_0}, {}_{t=1}^{n}$, where $c_{w,t}$ specifies the quantity of resource w available in period t.

Furthermore, the following decision variable are defined:

$d = (d_{j,t})_{j=1}^{m_2}, {}_{t=1}^{n}$, where $d_{j,t}$ is the quantity of demand for product j filled in period t, and $s = (s_{i,t})_{i=1}^{m_1}, {}_{t=1}^{n}$, where $s_{i,t}$ is the quantity of component i used in period t from the committed supply, $q = (q_{i,t})_{i=1}^{m_1}, {}_{t=1}^{n}$, where $q_{i,t}$ is the quantity of component i used in period t from the external supply.

For each raw material $i_0$, $1 \leq i_0 \leq m_1$, let MLP($i_0$, n) denote the following linear programming where M is a large number. We preferably give high weight to the components procured in earlier periods since we want to meet the demand as early as possible. The bounds constraints in the Linear Program ensures that we do not fill the demands too early and that we have a feasible procurement level. The second big M term in the object function preferably is added to ensure that we use the committed supply before acquiring any additional external supply.

$$\max \sum_{t=1}^{n} \{(n - t + 1) q_{i_0, t}\} - M \sum_{t=1}^{n} \left( \sum_{r=1}^{t} v_{i_0, r} - \sum_{r=1}^{t} s_{i_0, r} \right)$$

such that $$q_{i,t} + s_{i,t} - \sum_{j=1}^{m_1} \sum_{r=1}^{n} a_{i,j,t,r} d_{j,r} = 0, \quad \text{for } 1 \leq i \leq m_1, 1 \leq t \leq n, \quad \text{III}$$

$$\sum_{j=1}^{m_2} \sum_{r=1}^{n} g_{w,j,t,r} d_{j,r} \leq c_{r,t}, \quad \text{for } 1 \leq w \leq w_0, 1 \leq t \leq n,$$

$$\sum_{r=1}^{t} d_{j,r} \leq \sum_{r=1}^{t} d_{j,r}^{\max}, \quad \text{for } 1 \leq j \leq m_2, 1 \leq t \leq n,$$

$$\sum_{r=1}^{t} q_{i,r} \leq \sum_{r=1}^{t} e_{i,r}, \quad \text{for } 1 \leq i \leq m_1, 1 \leq t \leq n,$$

$$\sum_{r=1}^{t} s_{i,r} \leq \sum_{r=1}^{t} v_{i,r}, \quad \text{for } 1 \leq i \leq m_1, 1 \leq t \leq n,$$

$$q_{i,r} \geq 0, s_{i,r} \geq 0, \quad \text{for } 1 \leq i \leq m_1, 1 \leq r \leq n,$$

$$d_{j,r} \geq 0, \quad \text{for } 1 \leq j \leq m_2, 1 \leq r \leq n.$$

Let $(\hat{q}_{i_0,t})_{t=1}^{n}$ be the solution to the above linear program. Then $\hat{q}_{i_0,t}$ is the quantity used from the additional supply to produce products to meet the demand up to time period t. A portion of the quantity $\hat{q}_{i_0,t}$ may come from the unused external supply from the previous period. Since the lead-time factor has been taken care of in the linear programming formulation, we need only move forward the excessive quantity to the nearest periods that have the extra additional supply. Therefore, we preferably use an iterative procedure to shift the excessive procurement level backward. There is a linear programming as described above associated with each component $i_0$, $1 \leq i_0 \leq m_1$. To solve the SS problem, we need to solve $m_1$ LPs and apply the iterative procedure $m_1$ times. The procedure is as follows:

Procedure 2: Multi-Period Stochastic Squaring with Non-Zero Lead-Times.

Figure 7:
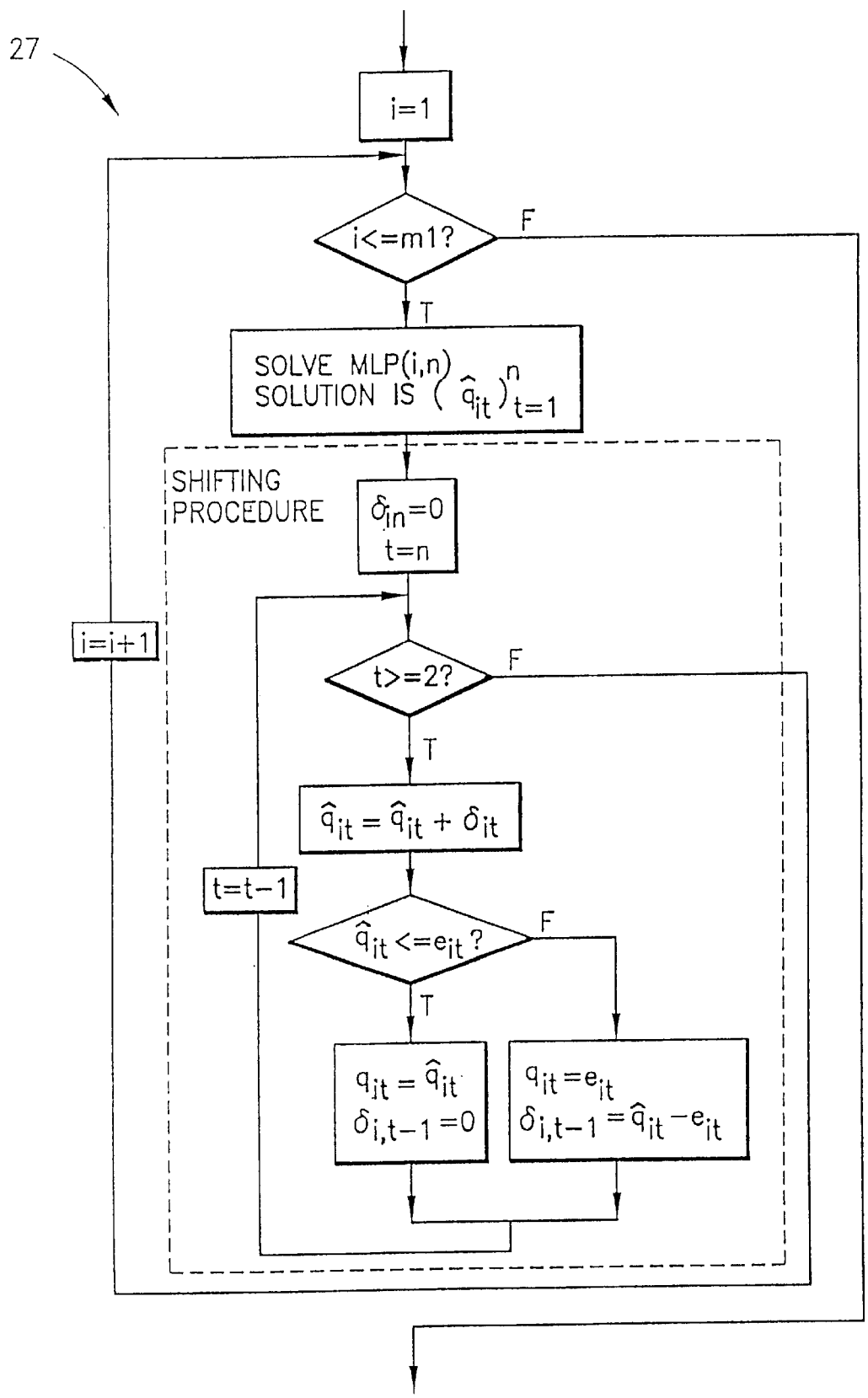
FIG. 7 provides a flow chart of a multi-period stochastic squaring with non-zero lead time procedure.

For $1 \leq i \leq m_1$ do
1. Solve the Linear Program MLP(i,n).
   Let $(\hat{q}_{i,t})_{t=1}^{n}$ be the solution of MLP(i,n).
2. Shifting Procedure: Construct SS solutions $q_{i,t}$ from $\hat{q}_{i,t}$ $\delta_{i,n} = 0$.
for t = n to 2 do
  $\hat{q}_{i,t} = \hat{q}_{i,t} + \delta_{i,t}$
  if $\hat{q}_{i,t} \leq e_{i,t}$ then do
    $q_{i,t} = \hat{q}_{i,t}$,
    $\delta_{i,t-1} = 0$,
  else do
    $q_{i,t} = e_{i,t}$,
    $\delta_{i,t-1} = \hat{q}_{i,t} - e_{i,t}$,
  end if
end for The output of Procedure 2, $(q_{i,t})_{i=1}^{m_1}, {}_{t=1}^{n}$ is the Stochastic Squaring Solution for the single-level, multiple-period stochastic squaring with nonzero lead-time problem. FIG. 7 (numeral 22) provides a flow chart of the multi-period stochastic squaring with non-zero leadtime procedure.

3.4 Multi-Level, Multi-Period Stochastic Squaring

When there are multiple levels in the Bill of Material, the stochastic squaring problem becomes much more complicated. Each component, whether it is a raw material, a subassembly, or a final product, may have original stock, committed supply, external supply and demand associated with it. Moreover, there are usually alternatives for making a product. A product can be made from raw material, subassemblies, or a combination of them. Deciding how much of some product is made and what components are used to meet the demand involves a trade-off between different performance measures such as costs and service levels.

Our objective is to use the stock and the committed supply of the components to meet demand as much as possible before acquiring additional external supplies. There are also many ways for acquiring additional external supplies to meet the demand. Additional supplies can be procured at the raw material level or at the subassembly level. The stochastic squaring solution may not be unique. To maintain flexibility and make use of common components, we give priority to the lower level components.

To obtain a stochastic squaring solution, our method is as follows: we start with the parts in level one (lowest level) and move up the BOM level by level. For each component i, we find the maximum possible usage of i after its committed supply is exhausted and the committed supplies of other parts are used as much as possible. Then, the resulting planned procurement quantity of i is added to its committed supply and treated just like the originally committed supply when higher-level components are processed. Thus, after we plan to procure a part, the planned procurement quantity is considered as committed, and is used along with the original committed supply before planning to procure external supplies of other components.

This method avoids over-procurement by making sure that no alternative components will be used to produce the product to meet demands that have already been filled. This process is called the SS allocation, and is continued until the procurement levels for all components are computed.

During the SS allocation process, we also find the maximum filled demand for each product based on the committed and additional external supplies. At the end of the SS allocation process, we have the maximum filled demand quantity for each product and the maximum usage of each additional supply. When the planned procurement quantity of a part i is first determined, that quantity can be exhausted by some feasible demand scenario. However, after the planned procurement quantities of higher-level parts that use part i are determined and added to the availability of those parts, it may not be possible to exhaust the planned procurement quantities of i. This is because when planning the procurement of the higher-level parts, some of the usage of i may be replaced by usage of a higher-level product, thereby diminishing the requirements for i.

To find the excessive planned procurements due to this situation, we explode the maximum filled demand that was obtained in the SS allocation stage and net it against the committed and the procured components. We then delete the excessive procured volumes from the SS allocation output. The resulting solution is a Stochastically Squared solution that can achieve maximum serviceability with a minimal set of inventory and cost.

The following procedure describes the methodology in detail.

We use the terminology and notation defined in the above sections except that some restrictions in previous sections are relaxed. All parts are allowed to have demands, and committed as well as additional supplies; therefore, raw material, subassemblies, and products are treated in the same way. Assume there are m parts numbered 1,2, . . . ,m. We define the additional decision variables $x=(x_{j,t})_{j=1}^{m},{}_{t=1}^{n}$, where $x_{j,t}$ is the quantity of part j produced in time period t.

Let MMLP($i_0$, n) be the following linear programming where M is a large number.

$$\max \sum_{t=1}^{n}(n-t+1)q_{i_0,t} - M\sum_{i=1}^{m}\sum_{t=1}^{n}\sum_{r=1}^{t}(v_{i,r}-s_{i,r})$$

subject to $$q_{i,t}+s_{i,t}+x_{i,t}-\sum_{j=1}^{m}\sum_{r=1}^{n}a_{i,j,t,r}x_{j,r}=d_{i,t}, \quad \text{for } 1\leq i\leq m, 1\leq t\leq n,$$

$$\sum_{j=1}^{m}\sum_{r=1}^{n}g_{w,j,t,r}x_{j,r}\leq c_{r,t}, \quad \text{for } 1\leq w\leq w_0, 1\leq t\leq n,$$

$$\sum_{r=1}^{t}d_{i,r}\leq \sum_{r=1}^{t}d_{i,r}^{\max}, \quad \text{for } 1\leq i\leq m, 1\leq t\leq n,$$

-continued $$\sum_{r=1}^{t}q_{i,r}\leq \sum_{r=1}^{t}e_{i,r}, \quad \text{for } 1\leq i\leq m, 1\leq t\leq n,$$

$$\sum_{r=1}^{t}s_{i,r}\leq \sum_{r=1}^{t}v_{i,r}, \quad \text{for } 1\leq i\leq m, 1\leq t\leq n,$$

$$q_{i,r}\geq 0, s_{i,r}\geq 0, \quad \text{for } 1\leq i\leq m, 1\leq r\leq n,$$

$$d_{i,t}\geq 0, \quad \text{for } 1\leq i\leq m, 1\leq t\leq n,$$

$$x_{i,t}=0, \quad \text{if } t\leq 0, \text{ for } 1\leq j\leq m.$$

The linear demand constraints can also be added to capture the linear relationships among the demands. The following procedure will find the SS solution for a multi-level, multi-period stochastic squaring problem. Procedure 3 Multi-Level, Multi-Period SS Solution.

Step 1. Label the BOM levels. Assume there are k levels. Let $S_l$ be the set of components that are in level 1 that have additional supplies, $S_l=\{C_{l,1}, C_{l,2} \ldots C_{l,m_l}\}$ Step 2. SS Allocation
  (i) Initialize the maximum filled demand variable $\hat{d}_{j,t}^{\max}$ to zero for $1\leq j\leq m$, $1\leq t\leq n$.
  (ii) for level l=1 to k do for i=1 to $m_l$ do
    a) Let $i_0$ be the part number corresponding to the node $C_{l,i}$. Solve the linear programming problem MMLP($i_0$, n). Let $(q_{i,t}^{0,i_0})_{t=1}^{n}$ and $(d_{j,t}^{i_0})_{j=1}^{m},{}_{t=1}^{n}$ be the solution values of the decision variable $q_{i,t}$ and $d_{i,t}$, respectively, for problem MMLP($i_0$, n). Update $\hat{d}_{j,t}^{\max}=\max\{\hat{d}_{j,t}^{i_0}\}$.
    b) Apply the shifting procedure (procedure 2) to get a feasible procurement solution, $(q_{i_0,t}^{i_0})_{t=1}^{n}$.
    c) Set $v_{i_0,t}=y_{i_0,hd\ t}+\hat{q}_{i_0,t}^{i_0}$, $e_{i_0,t}=0$, for $1\leq t\leq n$ end for
  end for Step 3. SS Explosion.
  1. Explode maximum filled demand quantities $(\hat{d}_{j,t}^{\max})_{j=1}^{m},{}_{t=1}^{n}$ against the planned procurement levels $(v_{i,t})_{i=1}^{m},{}_{t=1}^{n}$ obtained from the SS allocation procedure described above.
  2. Retrieve the excessive volume for each component at each time period from the explosion results. Denote the excess volume by $E=(E_{i,t})_{i=1}^{m},{}_{t=1}^{n}$.
  3. For each component i and time period t, delete the excessive volume from $\hat{q}_{i,t}^{i}$. That is, let $$\hat{q}_{i,t}^{i}=\hat{q}_{i,t}^{i}-E_{i,t}, \text{ for } 1\leq i\leq m, 1\leq t\leq n.$$

Figure 8:
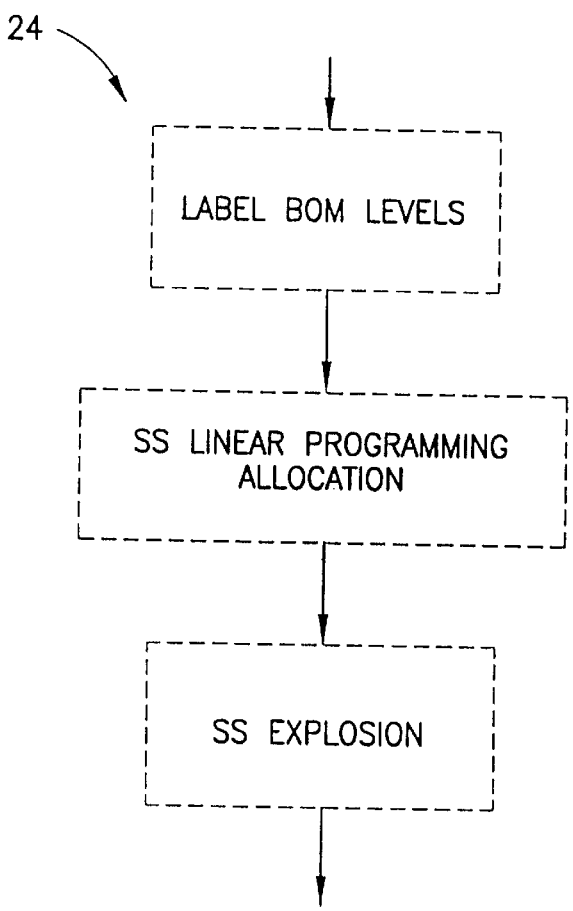
FIG. 8 provides a flow graph of a multi-level, multi-period stochastic squaring procedure.

FIG. 8 (numeral 24) provides a flow-graph of the multi-level, multi-period SS procedure.

Figure 9:
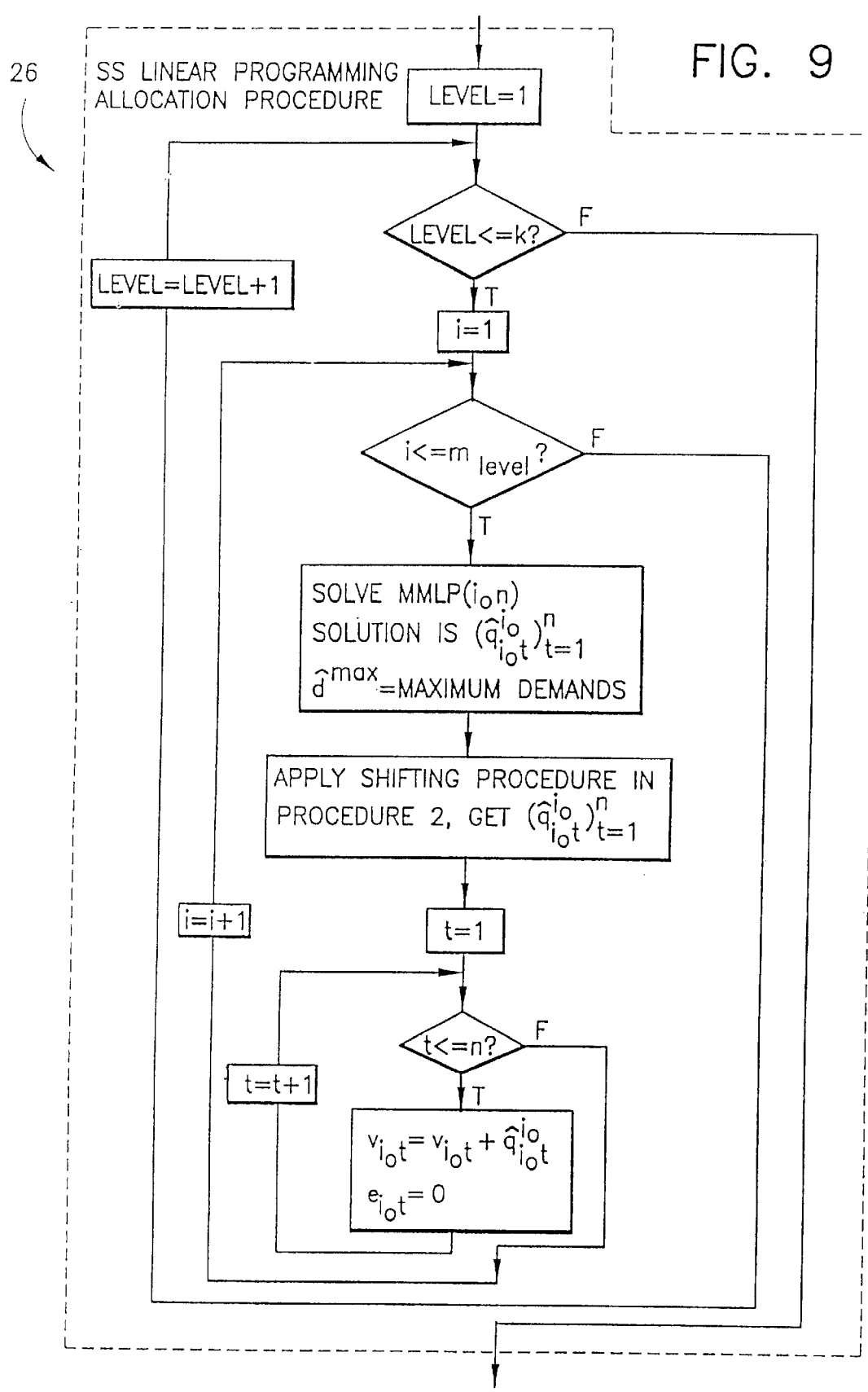
FIG. 9 provides a flow chart of a stochastic squaring linear programming procedure.

FIG. 9 (numeral 26) provides a flow chart of the SS linear programming procedure.

Figure 10:
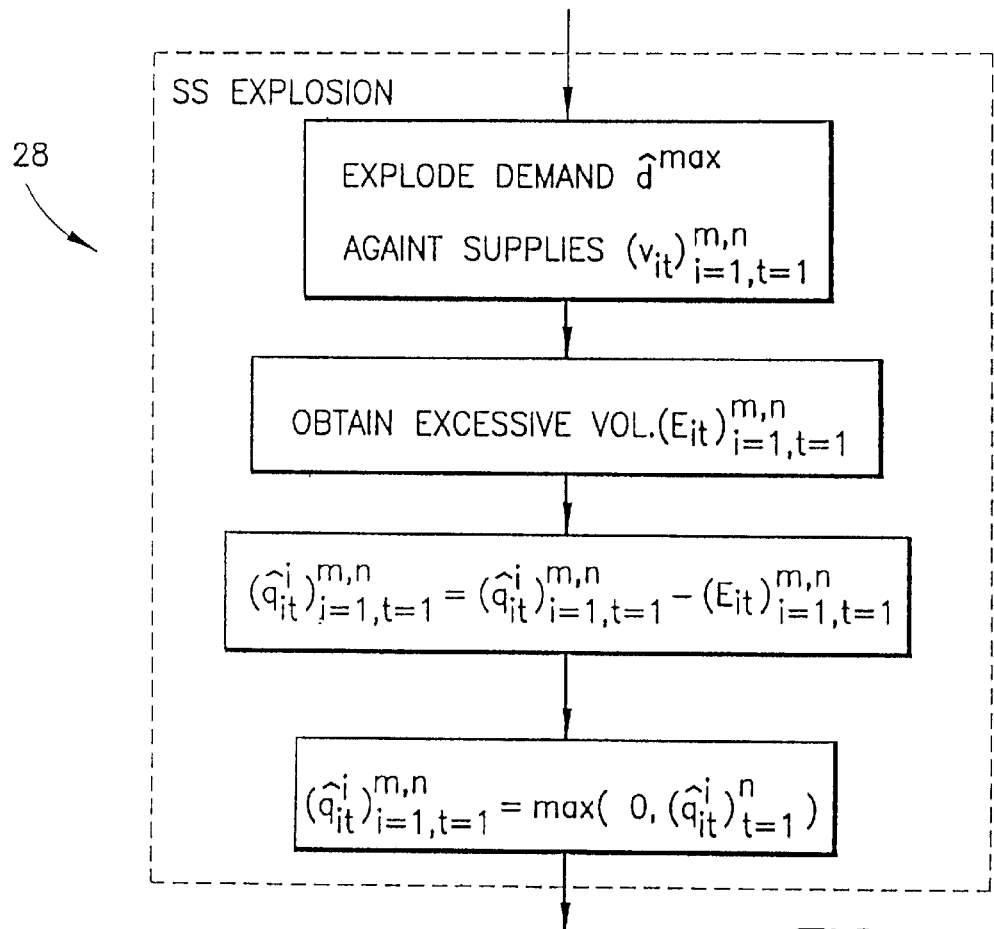
FIG. 10 provides a flow chart of a stochastic squaring explosion procedure.

FIG. 10 (numeral 28) provides a flow chart of the SS explosion procedure.

Figure 11:
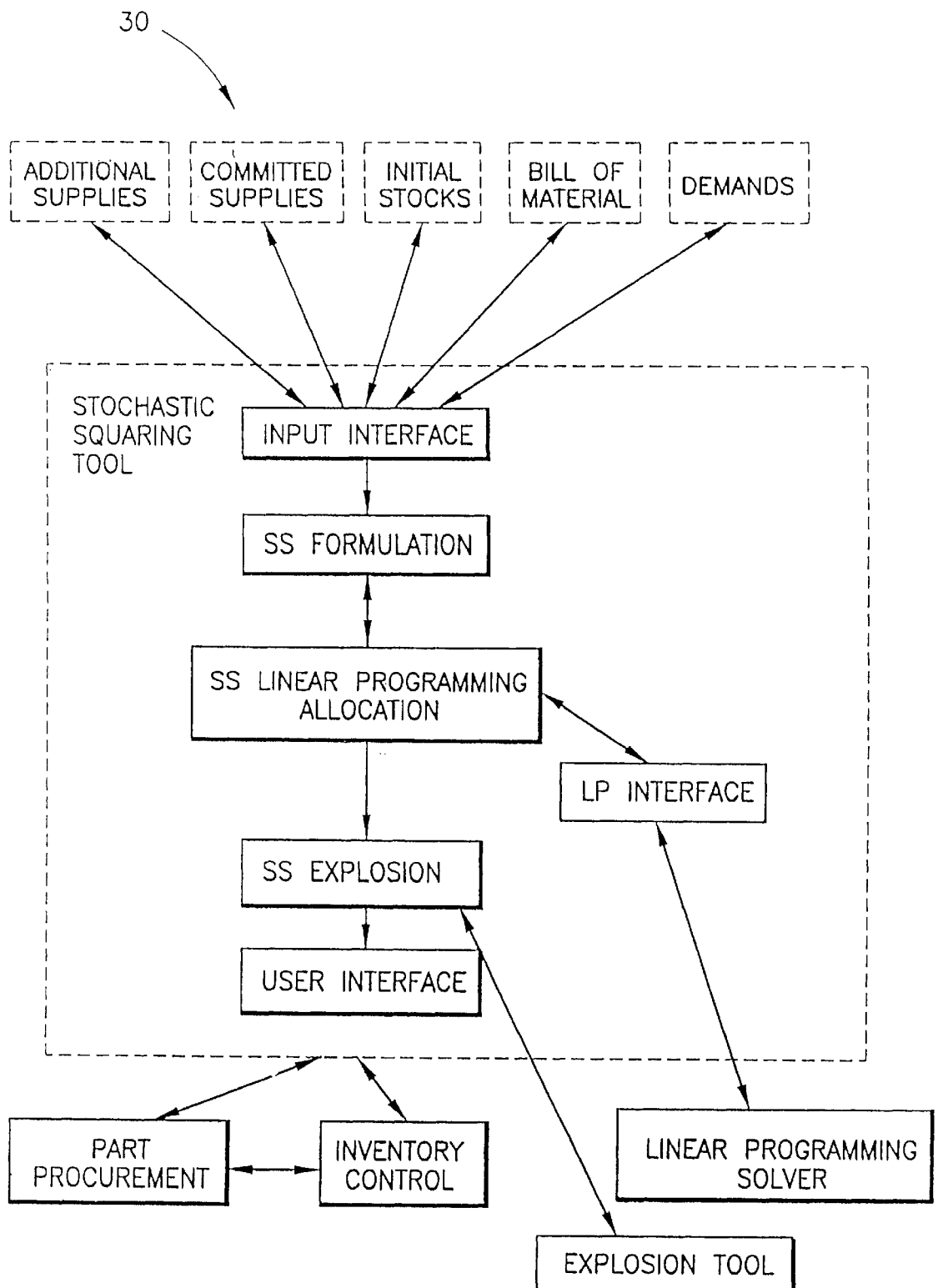
FIG. 11 shows a framework for one implementation of the SS system.

4 Implementation 4.1 Implementation of SS Using General Linear Programming Solver. Solving a sequence of linear programming problems presented in the previous sections produces the stochastic squaring solutions. A preferred stochastic squaring solution solver can be built by creating an input interface module for parsing the description of the problem including parts, BOM structure, supplies, and demand information, an SS formulation module (a translation module) converting the planning problem into the mathematical models defined in the last section, an SS allocation (computation) module that interfaces to a linear programming tool to compute the solution of the linear programming, an SS explosion module for post-processing the solution to compute SS solutions, and an output module for reporting the results. A preferred framework for the implementation of the SS system is shown in FIG. 11 (numeral 30).

4.2 Machine Implementation

Attention is now directed to FIG. 12, which illustrates a preferred machine implementation of the present invention. In particular, FIG. 12 comprises an electronic processor 32 preferably comprising an IBM RS6000 computer and associated memory, data base 34 and conventional output display 36. In operation, the data base 34 comprises bill of material, bill of capacity information, as well as constraints comprising at least one of constrained resources (r) and known maximum demands ($d_j$). The computer and associated memory act on database input in accordance with invention methodologies disclosed above, to an end of creating the production planning decision space, and locating, for each part (p), a region in the decision space corresponding to a high level of usage of part (p). The possible values for high levels of usage of part (p) may be plotted on the output display.

What is claimed:

1. A computer implemented process for determining procurement level for parts (P) in a production system having constraints comprising at least one of constrained resources (r) and known maximum demands $d_j$, comprising:

1) inputting to the computer, data including decision variables, production quantity, demand quantity, bill of material, bill of capacity and usage rate;

2) constructing in computer memory a production planning decision space consisting of independent sets of hyperplanes defined by decision variables $q_{j,t}$ corresponding to production quantities for products (j), said constructing including the steps of:
      a) expressing a potential usage of part (p) as a linear combination of production quantities ($q_j$);
      b) limiting the production quantities ($q_j$) so that it is less than or equal to the maximum demand quantity ($d_j$); and
      c) limiting the production quantities ($q_j$) so that the usage of each other resource (r) based on multiple level bill of material and bill of capacity usage rates is less than or equal to the availability of that resource;

3) locating a region in the decision space corresponding to a high level of usage of part (p); and 4) interactively displaying to a user candidate values in said decision space corresponding to the highest level of usage of part (p) so assist the user in deciding quantities of part (p) to procure necessary to enable achievement of the highest level of service, corresponding to the highest level of usage of part (p), while maintaining the lowest possible WIP and inventory on the basis of linear demand, resource, and supply constraining information.

2. A method according to claim 1, wherein the decision space is temporally expanded by the step of separating each decision variable $q_{j,t}$ into a set of decision variables $q_{j,t}$ according to a calendar mechanism to determine the quantity of activity j to do in a period t, said step further including modifying the creation of said independent sets of hyperplanes by adding decision variables $q_{j,t}$ corresponding to shipment of product, stock of materials, and scrapping of resources in each period; and expressing the demand for a product as demand quantities over time; and determining the time based cost factors on backlogging demand and carrying material; and expressing the availability of resources over time; and constructing an objective function consisting of a plurality of objective function coefficients and associated decision variables $q_{(j,t)}$, wherein said objective function rewards the shipment of products using a specific part(p) and penalizes holding or scrapping of part (p) or products using part(p); and using said objective function to locate a region in the decision space corresponding to a high level of usage of part (p).

3. A method according to claim 2, wherein step 2) comprises:

a) expressing a potential usage of part (p) in period t as a linear combination of production quantities $q_j$;

b) limiting the production quantities $q_j$ so that a cumulative production through a period r is less than or equal to cumulative maximum demand quantity through period r; and c) limiting the production quantities $q_j$ so that the usage of each other material or capacity resource (r) in a time period r based on bill of material and bill of capacity usage rates is less than or equal to the availability of that resource in time period r; and wherein step (2) further comprises locating a region in the decision space corresponding to a high level of usage of part (p) in period r.

4. A method according to claim 2, comprising the additional step of procuring parts in a period closest to the actual usage period for said parts consistent with the constraints of known available external supply.

5. A method according to claim 1, wherein the decision space is temporally expanded by the steps of:

(i) separating each decision variable $q_{j,t}$ into a set of decision variables $q_{j,t}$ according to a calendar mechanism to determine the quantity of activity i to do in a period t, said step further including modifying the creation of said independent sets of hyperplanes by adding decision variables $q_{j,t}$ corresponding to shipment of product, stock of materials, and scrapping of resources in each period; and expressing the demand for a product as demand quantities over time; and determining the time based cost factors on backlogging demand and carrying material; and expressing the availability of resources over time; and constructing an objective function consisting of a plurality of objective function coefficients and associated decision variables $q_{(j,t)}$, wherein said objective function rewards the shipment of products using a specific part(p) and penalizes holding or scrapping of part (p) or products using part (p); and using said objective function to locate a region in the decision space corresponding to a high level of usage of part (p).

(ii) adjusting the hyperplane to represent non-zero manufacturing lead times.

6. A method according to claim 5 where the Bill of Material BOM is multi-level ensuring that unnecessary parts are not procured when a choice exists between procuring parts or using existing subassemblies.

7. A method according to claim 1, wherein the step of locating an optimal region in the decision space comprising a high level of usage further includes constructing a special objective function comprising objective function coefficients for each of the decision variables.

8. A machine suitable for determining procurement level for parts (P) in a production arrangement having constraints comprising at least one of constrained resources ($r_i$) and known maximum demands ($d_j$) the machine comprising:

1) means for inputting data comprising variables including decision variables, production quantity, demand quantity, bill of material, bill of capacity and usage rates;

2) means for creating a production planned decision space comprising independent sets of hyperplanes defined by decision variables $q_{j,t}$ corresponding to product quantities for product (j), said means for creating comprising a) expressing a potential usage of part p) in period t as a linear combination of production quantities (q(j))
   b) limiting the production quantities $q_j$ so that a cumulative production through a period r is less than or equal to cumulative maximum demand quantity through period r; and
   c) limiting the production quantities $q_j$ so that the usage of each other resource (r) based on multiple level bill of material and bill of capacity usage rates is less than or equal to the availability of that resource and 3) means associated with each part (p) for locating a region in the decision space corresponding to the highest level of usage of part (p);

and 4) means for interactively displaying to a user candidate values in said decision space corresponding to the highest level of usage of part (p) to assist the user in deciding quantities of part (p) to procure necessary to enable achievement of the highest level of service, corresponding to the highest level of usage of part (p), while maintaining the lowest possible Work in Process WIP and inventory on the basis of linear demand, resource, and supply constraining information.

9. A machine according to claim 8 wherein the bill of materials comprises multiple levels ensuring that unnecessary parts are not procured when a choice exists between procuring parts or using existing subassemblies.

* * * * *

UNITED STATES PATENT AND TRADEMARK OFFICE
CERTIFICATE OF CORRECTION

PATENT NO. : 5,970,465
DATED : October 19, 1999
INVENTOR(S) : Brenda L. Dietrich, et al.

It is certified that error appears in the above-identified patent and that said Letters Patent is hereby corrected as shown below:

In the Abstract, line 1: after "procurement" insert --level--
Column 1, line 48: "This approach..." should not begin a new paragraph.
Column 8, line 60: "MAX where " should read --where dj,tmax --
Column 9, line 37: "As in the..." should begin a new paragraph.
Column 9, line 61: "In summary,..." should begin a new paragraph.
Column 14, line 17: "Procedure 3..." should begin a new paragraph.

Column 14, line 27: "$(q_i^{o_n}{}_t^{io})_{t=1}^n$ and $(d_{j,t}^{io})_{j=1,t=1}^{m\ n}$"
should read --$(q_{io,t}^{io})_{t=1}^n$ and $(d_{j,t}^{io})_{j=1,t=1}^{m\ n}$--

Column 14, line 31: "$(q_{io,t}^{io})_{t=1}^n$" should read --$(\hat{q}_{io,t}^{io})_{t=1}^n$--

Column 14, line 53: "Solving a sequence..." should begin a new paragraph.

Signed and Sealed this

Thirtieth Day of January, 2001

Attest:

Q. TODD DICKINSON

Attesting Officer

Director of Patents and Trademarks